United States Patent
Kieser et al.

(10) Patent No.: US 12,277,365 B2
(45) Date of Patent: Apr. 15, 2025

(54) AUDIO ARRANGEMENT AS WELL AS A METHOD FOR CAPTURING AND/OR CREATING A SYSTEM CONFIGURATION OF THE AUDIO ARRANGEMENT

(71) Applicant: Robert Bosch GmbH, Stuttgart (DE)

(72) Inventors: Tobias Kieser, Straubing (DE); Bastian Huber, Stephansposching (DE); Thomas Koppera, Zachenberg (DE)

(73) Assignee: Robert Bosch GmbH, Stuttgart (DE)

( * ) Notice: Subject to any disclaimer, the term of this patent is extended or adjusted under 35 U.S.C. 154(b) by 225 days.

(21) Appl. No.: 17/958,589

(22) Filed: Oct. 3, 2022

(65) Prior Publication Data

US 2023/0105747 A1    Apr. 6, 2023

(30) Foreign Application Priority Data

Oct. 1, 2021    (DE) .................. 10 2021 211 097.5

(51) Int. Cl.
*G06F 3/16* (2006.01)
*H04R 3/12* (2006.01)
*H04R 29/00* (2006.01)
*H04S 7/00* (2006.01)

(52) U.S. Cl.
CPC .............. *G06F 3/165* (2013.01); *G06F 3/167* (2013.01); *H04R 3/12* (2013.01); *H04R 29/007* (2013.01); *H04S 7/30* (2013.01)

(58) Field of Classification Search
CPC ........... G06F 3/162; G06F 17/00; G06F 16/61
USPC .......................................................... 700/94
See application file for complete search history.

(56) References Cited

U.S. PATENT DOCUMENTS

| | | | |
|---|---|---|---|
| 2005/0152557 A1* | 7/2005 | Sasaki | H04S 7/302 381/59 |
| 2016/0253145 A1* | 9/2016 | Lee | G06F 3/162 381/79 |
| 2018/0136898 A1* | 5/2018 | Shi | H04S 7/308 |
| 2018/0176688 A1* | 6/2018 | Baek | H04R 5/04 |
| 2020/0310745 A1* | 10/2020 | Kim | H04N 5/60 |
| 2023/0208921 A1* | 6/2023 | Dickins | H04S 7/303 381/95 |

FOREIGN PATENT DOCUMENTS

DE    102018214695 A1    3/2020

* cited by examiner

*Primary Examiner* — Alexander Krzystan
(74) *Attorney, Agent, or Firm* — Michael Best & Friedrich LLP

(57) ABSTRACT

An audio arrangement with a plurality of audio devices and a central device. A unique address is assigned to each audio device of a basic set in a data environment so that the central device can selectively send messages to the audio devices of the basic set. The central device includes a data-technology selection area for a selected set of audio devices from the basic set, and a communication module for activating a notification mode of the audio devices of the selected set. Each of the audio devices includes a human-machine interface and are configured to send a notification message to the central device in the notification mode when the human-machine interface is actuated. The central device lists the audio devices of the selected set in a list area in the order in which the notification message is received at the central device.

12 Claims, 5 Drawing Sheets

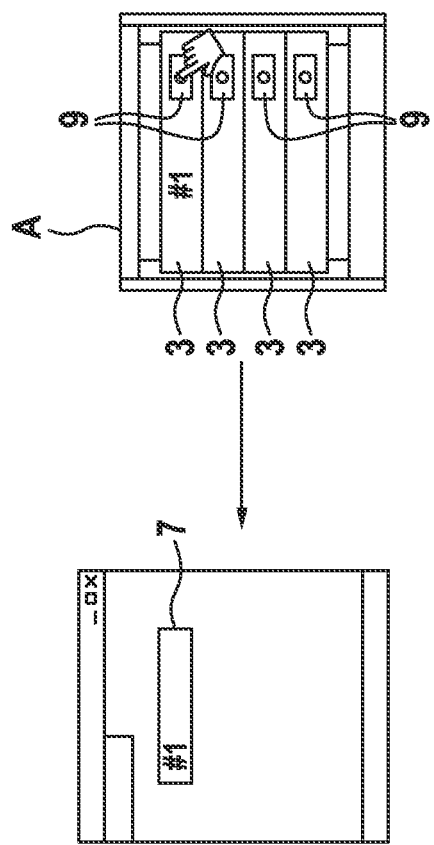
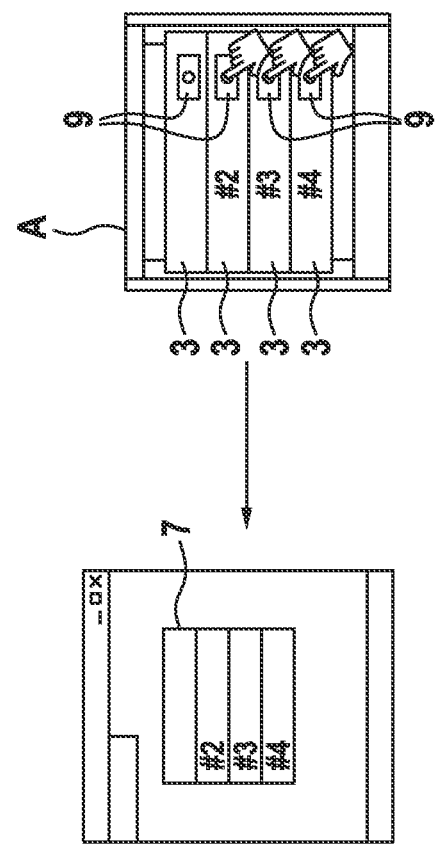
Fig. 3a
Fig. 3b

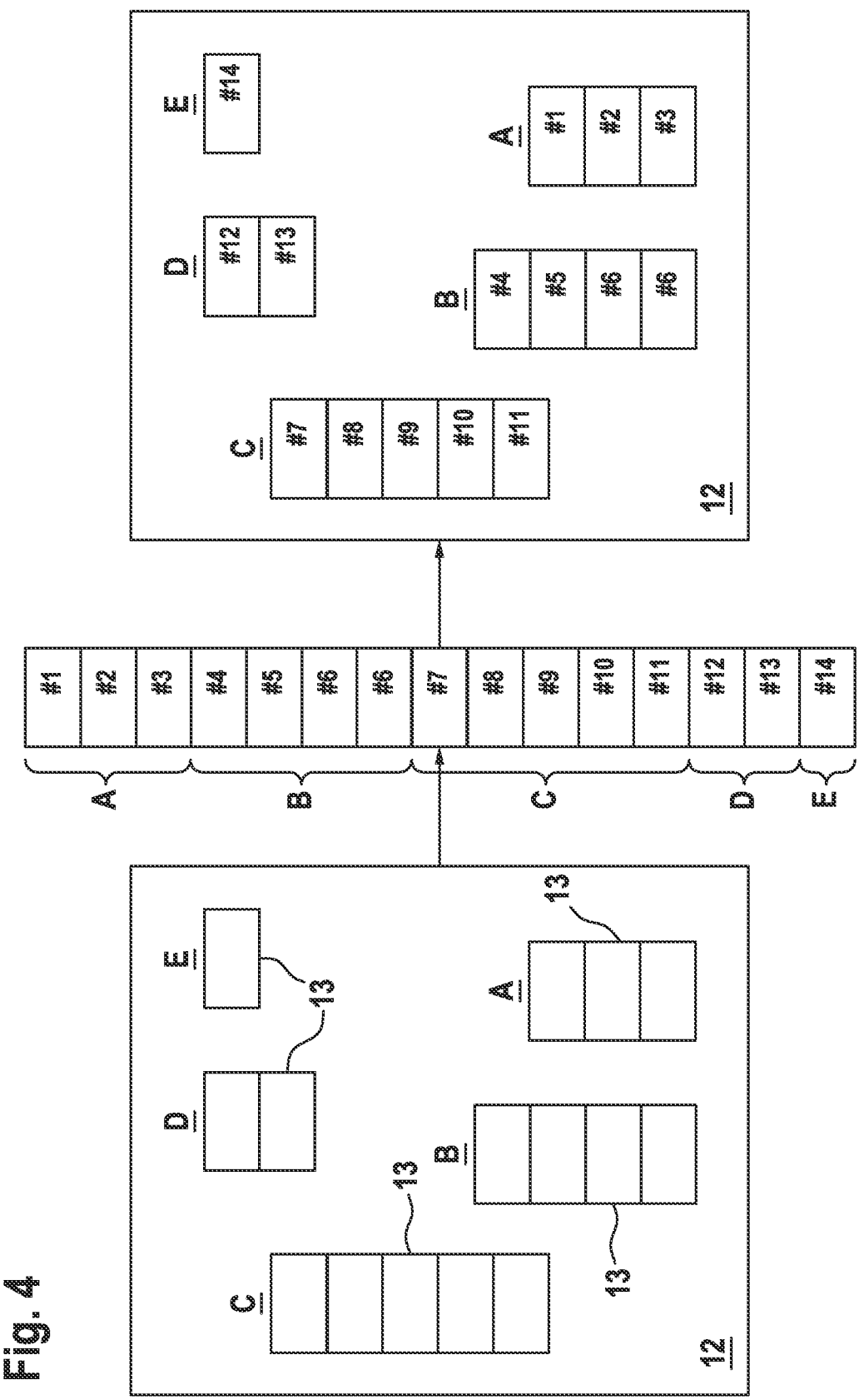

AUDIO ARRANGEMENT AS WELL AS A METHOD FOR CAPTURING AND/OR CREATING A SYSTEM CONFIGURATION OF THE AUDIO ARRANGEMENT

BACKGROUND OF THE INVENTION

The invention relates to an audio arrangement as well as to a method for capturing and/or creating a system configuration of the audio arrangement.

In large public address systems, installers spend a considerable amount of time entering a system image into configuration software. Primarily in live sound (touring) scenarios, time is a scarce resource for the installer and sound technician. One of the steps in creating a system image in configuration software is to find and assign physical devices to the digital representation in the software. In particular in large systems, this process is time-consuming and error-prone.

Publication DE 10 2018 214 695 A1 discloses a public address arrangement and a corresponding method. In this publication, a system is proposed in which the detection of the wiring and/or the checking of the integrity of the wiring takes place automatically.

SUMMARY OF THE INVENTION

In the context of the present invention, an audio arrangement as well as a method are proposed. Preferred or advantageous embodiments of the invention arise from the sub-claims, the following description and the enclosed sub-claims.

The subject matter of the invention is an audio arrangement having a plurality of audio devices. For example, the audio arrangement may be designed as a so-called public address arrangement. The public address arrangement in particular forms a public address system. By means of the public address arrangement, an audio signal is in particular spatially distributed and/or can be radiated at different spatial points. For example, the public address arrangement is configured to transmit voice information or a warning, for example by means of a signal tone, and especially forms a local call system. In particular, it may also be provided that the audio arrangement forms an arrangement for use in event technology, for example stagecraft and/or sound technology. The audio signal is in particular an analog electrical signal or an acoustic signal. However, it may also be a music system for orchestra performances, music performances, dance events, etc. It is also possible for the audio arrangement to be configured as a public address system for a conference or the like.

For example, the audio devices may be configured as amplifiers, microphones, speakers, audio sensors, audio outputs, audio amplifiers, etc. In particular, the audio arrangement comprises at least 10, preferably 20, especially at least 50 such audio devices.

The audio arrangement comprises a central device for controlling the audio devices. The central device may be configured as a centralized device; alternatively, it is realized as a distributed device and in particular to be understood as a logical central device. For example, the central device is configured as a digital data processing device, in particular as a computer. In particular, configuration software for the system configuration of the audio arrangement runs on the central device.

The central device serves to control the audio devices and may, for example, send control commands to the audio devices, for example regarding activation and/or deactivation, amplification, volume, and other parameters.

The central device is arranged with the audio devices in a common data environment. For example, the data environment may be configured as a network environment. In this case, it is possible that the central device and/or the audio devices are arranged wired or also wirelessly in the data environment.

The audio devices, which can and/or are connected by means of data technology to the central device in the data environment, form a basic set of audio devices. For example, the central device may have a basic area in which the basic set of the audio devices is recorded. The basic area can be realized as a data area, for example, in particular as a storage area. Preferably, a unique address is assigned to each audio device of the basic set after the data connections have been established. In the event that the data environment is a network environment, the unique address may be realized as a network address. Preferably, the central device can selectively send messages to the respective audio device of the basic set via the unique address. In doing so, it is possible that the message is transmitted as a unicast, i.e., exclusively from the central device to the respective audio device. The connection in this case may be a bi-directional connection or a uni-directional connection. Via the unique address, the central device is thus able to selectively send messages to the desired audio device of the basic set in the data environment.

The central device comprises a selection area for data technology, wherein the selection area for data technology is configured, for example, as a data area, preferably as a storage area. In the data technology selection area, the central device can hold a selected set of audio devices of the basic set. It is possible that this is a proper subset of the basic set so that the cardinal number of the selected set is less than the cardinal number of the basic set. Alternatively, it is also possible that it is an improper subset so that the selected set corresponds to the basic set. It is also not absolutely necessary that the selection area and the basic area are physically different areas in the central device; rather, these are logical assignments. However, it may be provided that different storage areas are assigned to these sets.

The central device comprises a communication module for activating a notification mode of the audio devices of the selected set. In particular, the central device sends a message via the communication module to the audio devices of the selected set. If the selected set is smaller than the basic set, the audio devices are addressed selectively or in a multicast, for example. Alternatively, to the extent that the selected set corresponds to the basic set, a broadcast message may be sent. Once the audio devices receive the corresponding message, they are put into a notification mode.

The audio devices each comprise a human-machine interface, wherein the audio devices, in particular the audio devices of the selected set, are configured to send a notification message to the central device in the notification mode when the human-machine interface is actuated locally and/or manually. In other words, the audio devices are "set to focus" in the notification mode so that they report to the central device when manually actuated. The term "local actuation" is in particular understood to mean that a user must be locally at the audio device to actuate it. The term "manual actuation" is in particular understood to mean that the user performs a manual action at the audio device to actuate it. The term "send" is in particular understood to mean the transmission of a confirmation of the actuation so that a transmission can, for example, also represent an acknowledgment of a request.

It is provided that the central device comprises a list area. The list areas can in particular be configured as a data area, especially as a storage area. The central device is configured to list the audio devices of the selected set in the list area in the order in which the notification message is received at the central device. In particular, the list area keeps an ordered list of the audio devices of the selected set in the order in which the notification message is received at the central device. The list area forms the system configuration or at least part or a basis of the system configuration. Preferably, the list area comprises at least 5, in particular at least 10, especially more than 20 audio devices.

It is a consideration of the invention in this respect that an at least semi-automated capture and/or creation of system configurations is enabled with the audio arrangement. While it has so far been necessary for the unique assignment of the audio devices in the system configuration to the audio devices to be 1:1 in order to identify the audio devices and assign them to the digital representation in the central device, the invention provides the possibility of putting a plurality or even all of the audio devices into a notification mode, subsequently manually and/or locally actuating the audio devices in succession and, as a result, obtaining a list of the audio devices in the list area in the order of actuation.

For example, if a multiplicity of audio devices is arranged next to one another in four control cabinets, it is now possible for a user to actuate them, for example, control cabinet by control cabinet and, for example, from top to bottom, i.e., to actuate them in an order according to an actuation rule, which the user can remember comparatively easily. Upon return to the central device, it is clear to the user that a first group of audio devices is arranged in the list area, which the first control cabinet and is arranged in the corresponding order from top to bottom. Subsequently, a second group is arranged in the list area, which is associated with the second control cabinet and is arranged in the specified order, etc. Each time the user goes to the audio devices, the user can thus, in a semi-automated manner, identify a plurality of audio devices and assign them to the digital representatives. In this way, a fully automatic assignment is not yet achieved, but the daily work in the system configuration is significantly simplified.

In a preferred realization of the invention, the human-machine interface is configured as an actuation button. For example, it may also be provided that the actuation button is connected to an optical signal device, such as a lamp, which is activated when the notification mode is activated on the audio device. In this way, a further indication is given to the user as to which audio devices are currently being assigned. The human-machine interface may take on a different function in the later operation of the audio device, so that the interface has at least a dual function.

In a preferred development of the invention, the communication module is configured to perform an auto setup. In the auto setup, the data environment is scanned by the central device for audio devices or setup messages are accepted from audio devices of the data environment, wherein the detected audio devices are collected in the basic area for the basic set of the audio devices. In this basic set, further operating parameters, in particular the unique address of the respective audio device, are assigned. This development once again highlights the advantages in the audio arrangement: Thus, it is known to capture all audio devices by scanning the data environment, but it has not yet been possible to obtain an indication of the position of the audio devices or their spatial distribution. This further information can be obtained through the particular configuration of the invention and can be attributed to the system configuration.

In a preferred development of the invention, the central device comprises a model module, wherein the model module keeps a model of the audio devices in a model status, wherein the model maps the system configuration. The audio devices are distributed in the model, wherein the audio devices in the model are distributed as a list area or as list area sections. For example, the model may be configured as a 2D model or a purely logical model. For example, the user may interactively divide the created list area into list area sections and distribute and/or arrange these list area sections such that the user can easily assign them to the respective audio devices or the collections of the audio devices.

Particularly preferably, a list area section is modeled as a local arrangement, such as a rack, control cabinet, or the like, with audio devices.

In an alternative or development of the invention, the model module comprises, in particular in a project planning status, a model with a placeholder for list area sections. The model module is configured so that one or more of the placeholders can be selected and filled with audio devices of the selected set in the list area section of the placeholder in the order in which the notification message is received at the central device. For example, it is possible for the user to project the planned audio environment of the audio arrangement in an empty model. It virtually provides the placeholders as containers for the audio devices. For example, during installation, the user may put the total basic set as the selected set into the notification mode. Beforehand or afterwards, the user can select one or more placeholders and then subsequently actuate them by manually and/or locally actuating the human-machine interface of the desired audio devices that are to be put into the placeholders. In this way, the placeholders can easily be filled semi-automatically, thus creating the model as a system configuration.

In a preferred development of the invention, the central device comprises a user interface, such as a graphical user interface, wherein the central device is configured to distribute, in particular interactively, the list areas and/or list area sections in the model on the basis of a manual input via the user interface.

A further subject matter of the invention relates to a method for capturing and/or creating a system configuration of an audio arrangement, in particular the audio arrangement as described above or according to one of the preceding claims.

The audio arrangement comprises a central device and a plurality of audio devices. It is provided that the audio devices of the central device are connected by means of data technology in a data environment. A unique address is assigned to each audio device so that the central device can selectively send messages to the audio devices. The central device activates a notification mode for the audio devices of a selected set. In a further step, the activated audio devices transmit a notification message to the central device when a human-machine interface of the audio devices is locally and/or manually actuated.

In a further step, the central device lists the audio devices of the selected set as an ordered list in a list area in the order in which the notification message is received at the central device. For example, audio devices that do not send a notification message are placed at the end of the list or are removed by means of data technology.

In a preceding or parallel step, an auto setup may be performed, wherein the central device captures all audio devices in the data environment and forms or supplements the basic set from the captured audio devices. For example, it can be provided that in the event that additional audio devices are integrated into the data environment, the auto setup may be performed again.

In a first configuration mode, the selected set is determined from the basic set or is formed by the basic set. Subsequently, the audio devices of the selected set are put into the notification mode. In a next step, the audio devices are actuated locally and/or manually by a user. The central device creates a list area and/or list area sections from the list area as described above. Subsequently, the list area and/or list area sections are distributed, in particular interactively, by the user in the model. This creates a system configuration model in the first configuration mode.

In a second configuration mode, a model with placeholders for list area sections is created first. At least one placeholder is subsequently selected. In addition, the audio devices of the selected set are put into the notification mode. In a next step, the audio devices are actuated locally and/or manually by a user. Finally, the placeholder is filled with audio devices of the selected set in the order in which the notification message is received at the central device. This creates a system configuration model in the second configuration mode.

BRIEF DESCRIPTION OF THE DRAWINGS

Further features, advantages and effects arise from the following description of preferred exemplary embodiments of the invention as well as the enclosed figures. The figures show:

FIG. 3 a, b a schematic representation of the first configuration mode in a possible graphical implementation;

FIG. 4 a schematic representation of a second configuration mode of the audio arrangement in FIG. 1;

DETAILED DESCRIPTION

Figure 1:
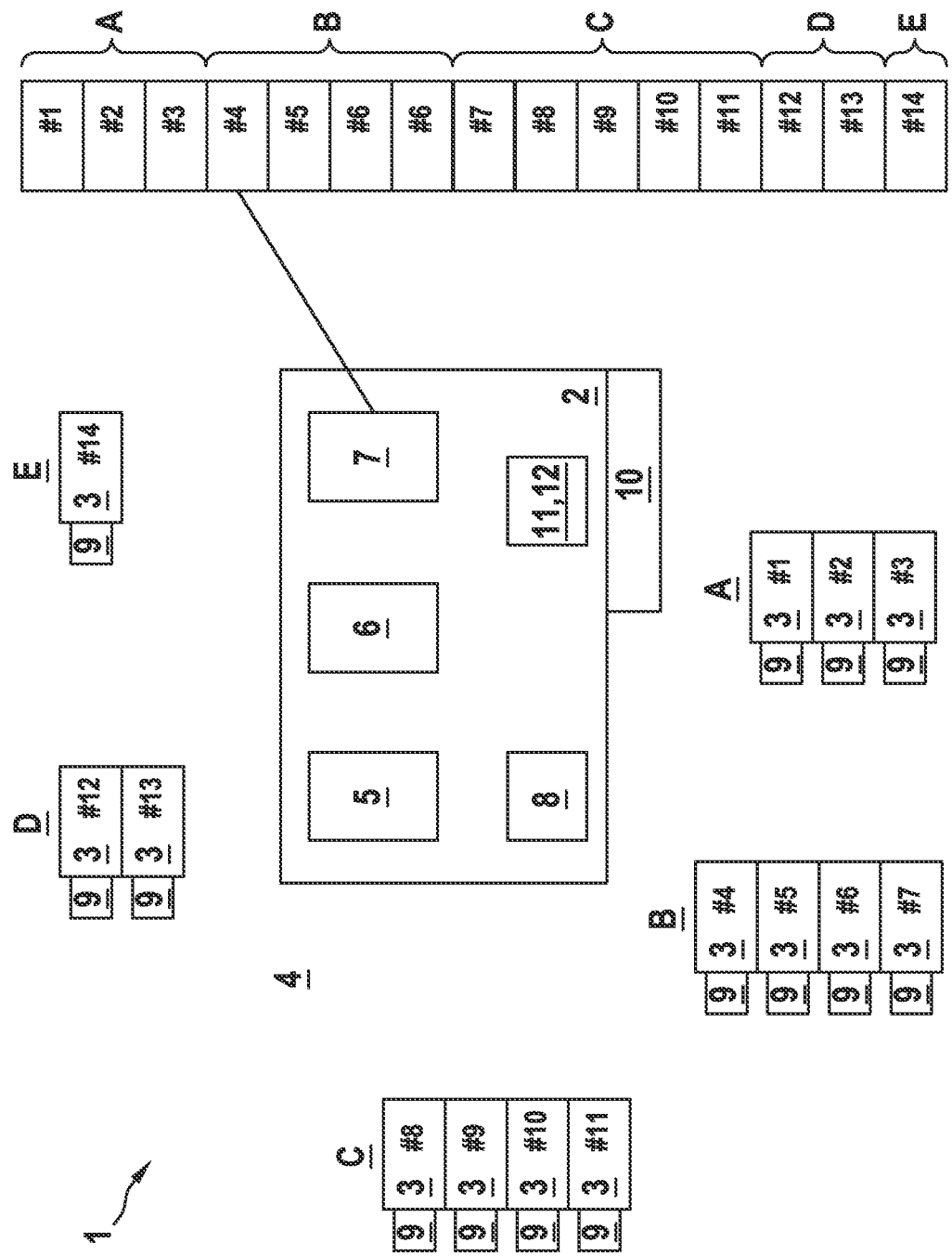
FIG. 1 a schematic block diagram of an audio arrangement as an exemplary embodiment of the invention.

FIG. 1 shows a schematic block diagram of an audio arrangement 1 as an exemplary embodiment of the invention. The audio arrangement 1 comprises a central device 2 and a plurality of audio devices 3. For example, the audio arrangement 1 can be configured as a public address system for concerts, orchestras, discussions, etc. Alternatively, the audio arrangement is realized as a public address arrangement.

The central device 2 may be configured as a digital data processing device, such as a computer. The audio devices 3 are, for example, configured as speakers, monitors, amplifiers, mixers, microphones, etc.

The components of the audio arrangement 1 can communicate with one another; in particular, the audio devices 3 can be addressed by the central device 2 so that operating parameters or control commands, such as volume levels, sensitivity, activation, deactivation, etc., can be transmitted to the audio devices 3. For a clear control of the audio arrangement 1, it is necessary to set a system configuration, wherein the system configuration stores the components of the audio arrangement 1.

The audio arrangement 1 comprises a data environment 4, wherein the audio devices 3 are connected to the central device 2 via the data environment 4. The data environment 4 can in particular be a network environment. Optionally, the audio devices 3 can also be connected to one another by means of data technology via the data environment 4. The central device 2 can communicate with each audio device 3 via the data environment 4, wherein a unique address is assigned to each audio device 3 so that messages can be selectively sent by the central device 2 to the audio devices 3.

The central device 2 comprises a data-technology basic area 5, a data-technology selection area 6 and a data-technology list area 7. The areas 5, 6, 7 are configured as data areas, e.g., as storage areas.

In the basic area 5, all audio devices 3 are listed, which are connected by means of data technology to the central device 2, wherein they form a basic set of audio devices 3. In the selection area 6, a selected set of the basic set from the basic area 5 can be kept or, depending on the embodiment, the basic set can be provided as the selected set. In the list area 7, a sorted list of the audio devices 3 from the selection area 6 and/or the selected set is arranged.

The basic function of the central device 2 for creating a system configuration is as follows:

In one step, a message is sent to the audio devices 3 from the selected set of the selection region 6 via a communication module 8, which forms part of the central device 2. In response to receiving the message, the respective audio devices 3 activate a notification mode. This can be visualized on the audio devices 3 via an optical signal device, for example.

The audio devices 3 each comprise a human-machine interface 9, which is configured as, for example, an actuation button or the like. In particular, a human-machine interface 9 can be used, which is already necessary for actuating the audio device 3.

In a subsequent step, a user actuates the human-machine interfaces 9 of the audio devices 3, which are in the notification mode.

In response to the local and/or manual actuation, the respective audio devices 3 send a notification message to the central device 2, in particular via the communication module 8.

The central device 2 is configured to arrange the audio devices 3 from the selected set from the selection area 6 in the list area 7, namely in the order of the incoming notification messages of the audio devices 3.

FIG. 1 shows an exemplary embodiment, wherein the selected set corresponds to the basic set and all audio devices 3 are put into the notification mode. The audio devices 3 are arranged in collections A, B, C, D, E, which may, e.g., correspond to racks or control cabinets. The user actuates the human-machine interfaces 9 of the audio devices 3 in succession but actuates them in a comprehensible manner. For example, in the exemplary embodiment in FIG. 1, the collections A, B, C, D, E of the audio devices 3 are actuated counterclockwise and within the collections A, B, C, D, E from top to bottom. This actuation rule is easy for the user to implement.

As a result, the list area 7 is subsequently constructed, which is visualized on the right side in FIG. 1. The audio devices 3 or their digital representatives are sorted in order in which the notification messages are received and thus in the order in which the human-machine interfaces 9 are actuated. This is visualized with actuation numbers #1, #2, #3, . . . .

From the actuation rule, the user can now deduce that the first three places represent a first collection A of audio devices 3, the next four entries represent a second collection B of audio devices 3, the next four places represent a third collection of audio devices, etc.

The advantage of this procedure is thus that the user only has to pass and actuate all audio devices 3 from the selected set once in a comprehensible manner based on an actuation rule in order to subsequently obtain a list area 7, in which the audio devices 3 are arranged sorted in a comprehensible manner for the user.

Figure 2:
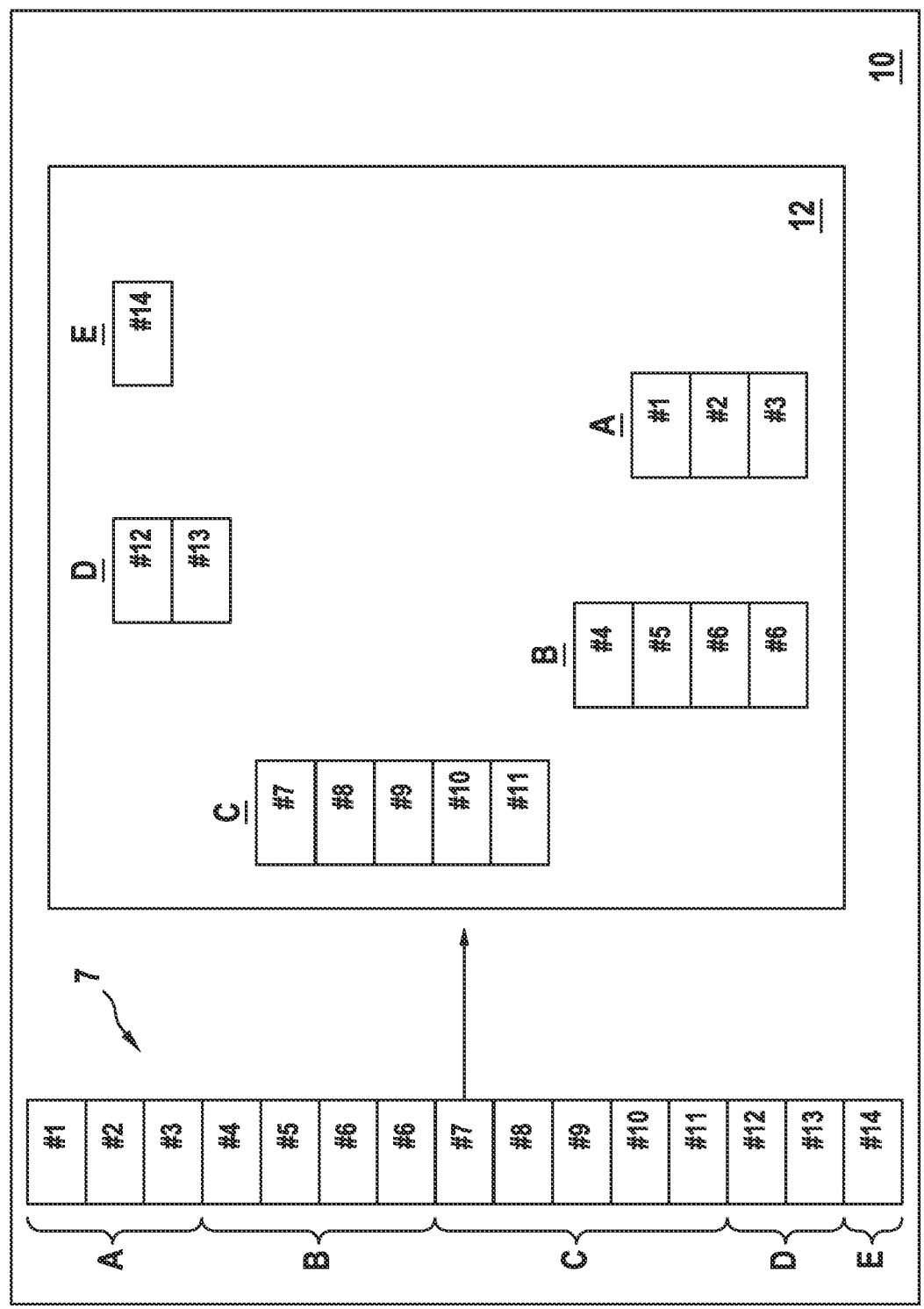
FIG. 2 a schematic representation of a first configuration mode of the audio arrangement in FIG. 1.

FIG. 2 shows a first configuration mode for the further system configuration, wherein, for example via a graphical interface 10 of the central device 2 in a model module 11, the user, knowing the collections A, B, C, D, E, divides the list area 7 into list area sections and arranges them in a model 12 in the correct positions.

In doing so, the user, for example, interactively pulls the first collection A with three entries to the position of the physical representative. With the further entries, the user proceeds in the same manner so that the model 12 subsequently clearly shows the system configuration of the audio arrangement 1 for the user.

FIGS. 3 a, b, schematically show the method. The right side shows the collection A of audio devices 3, wherein the audio devices 3 are in the notification mode. In FIG. 3 a, the uppermost audio device 3 is pressed first so that it obtains the notification number #1 and is entered into the list area 7. In FIG. 3 b, the further audio devices 3 are subsequently actuated by the respective human-machine interface 9 so that they obtain the notification numbers #2, #3, #4 according to the order of actuation. The subsequent notification numbers #2, #3, #4 are likewise entered into the list area 7. Knowing the actuation rule, the user may uniquely identify the audio devices 3 from the list area 7 and, for example, selectively send messages to the audio devices 3.

This method illuminates a variant of the method in the creation of a new system image when all audio devices are already connected on the network as the data environment 4. For example, the user starts configuration software of the central device 2 and puts the configuration software into an "auto" mode. The configuration software permanently, alternatively intermittently recurrently, connects to all audio devices 3 in the data environment 4 via a protocol defined per audio device 3. The configuration software then prompts the user to go to all audio devices 3 associated with the system image and to press any button of the audio device 3 in a special order. For example, the order would be rack by rack as collections A, B, C, D, E, from top to bottom. Pressing any button is detected by the configuration software and the audio device 3 is added correspondingly to the system image in the most accurate order possible that was originally determined. After the user has physically selected all desired audio devices 3, the user ends the "auto" mode of the configuration software. As an end result, the user automatically finds the selected audio devices 3 with assignment and order in the system image of the configuration software as the system configuration.

FIG. 4 shows a second configuration mode, wherein the user first projects the model 12 and picturizes it with a plurality of placeholders 13. The placeholders 13 represent the expected audio devices 3 in the planned system configuration.

In the system configuration, all audio devices 3 of the basic set are addressed via the communication module 8. Furthermore, the user defines an order of filling the placeholders 13, as indicated by the letters A, B, C, D, E, F. The user thus uses an actuation rule. The user then actuates the audio devices 3, in particular the human-machine interface 9 of the audio devices 3, in the order specified via the actuation rules.

Subsequently, the ordered list is created first the list area 7 and is distributed automatically in a final step by the central device 2 and/or the model module 11 to the corresponding placeholders 13 in order to perform the system configuration in an almost fully automated manner in this way.

Figure 5:
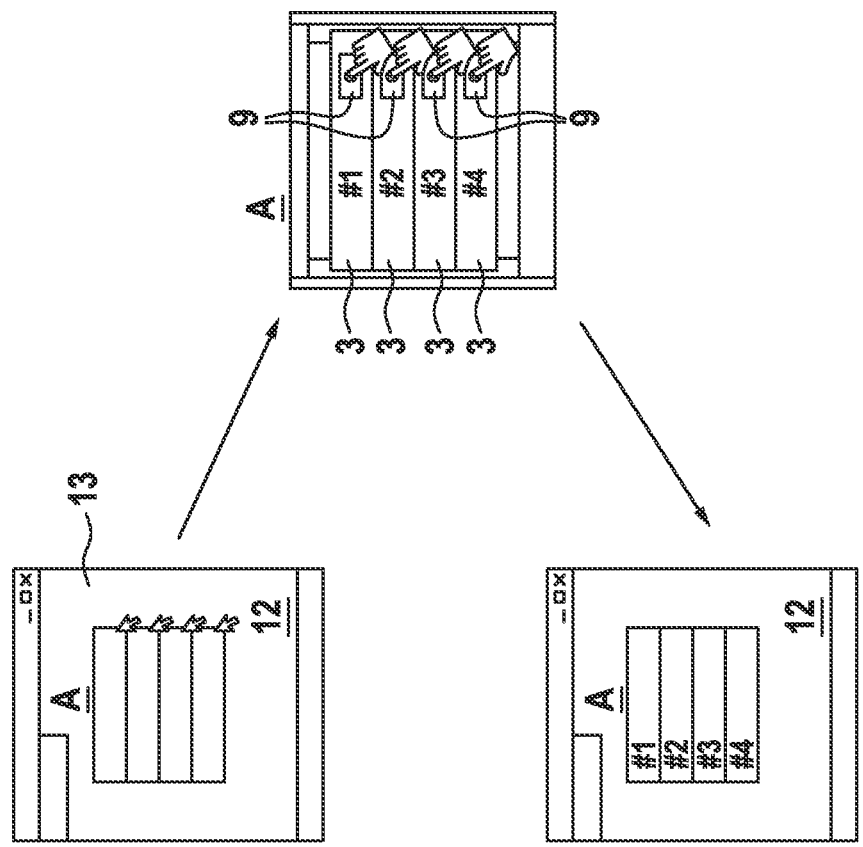
FIG. 5 a schematic representation of the second configuration mode in a possible graphical implementation.

FIG. 5 again shows the main steps of the second configuration mode. First, placeholders 13 are created in the model 12. The audio devices 3 are subsequently transferred into the notification mode. In a next step, the audio devices 3 are actuated via the human-machine interface 9, wherein the audio devices 3 are entered into the placeholders 13 in the order in which the notification message is received at the central device 2 and/or the communication module 8. This is shown here by way of example for the collection A, the audio devices 3 of the further collections B, C, D, E may subsequently be incorporated into the system configuration in the same way. Alternatively, all audio devices 3 of collections A, B, C, D, E may be actuated according to the actuation rule in one pass and the model 12 may automatically be entered as the system configuration. The second variant illuminates the method in an existing project. This is usually used when a user prepares a purely virtual project as model 12. In this case, the term "virtual" means that a system image has already been generated by the user, but no assignment of true physical audio devices to the digital device representatives has been made in the configuration software. Instead, the placeholders 13 are used.

The user generates a defined order of digital representatives by multiselection as a placeholder 13. The user subsequently puts the configuration software into "auto" mode. Then, as in the first configuration mode, the user proceeds to the physical audio devices 3 and selects one audio device 3 after the other in the order the user defined. The user subsequently stops the "auto" mode. As an end result, the user finds the assigned audio devices in the system image of the configuration software.

The advantage is that assigning audio devices 3 or creating a system image as a system configuration is semi-automated, faster, more robust against manual errors and more comfortable to use. The method is inter alia also of great relevance because the user experience of the user during unboxing and subsequent commissioning of the audio devices 3 is significantly improved.

Optionally, in a preliminary step, the data environment 4 can be scanned by the central device 2 in order to enter all available audio devices 3 into the basic set of the basic area 5.

The invention claimed is:

1. An audio arrangement (1) comprising:
 a plurality of audio devices (3), and
 a central device (2) for controlling the audio devices (3), wherein the audio devices (3) of a basic set are configured to connect by means of data technology to the central device (2) in a data environment (4),
 wherein the central device (2) comprises a data-technology selection area (6) for a selected set of audio devices (3) from the basic set,
 wherein the central device (2) comprises a communication module (8) for activating a notification mode of the audio devices (3) of the selected set,
 wherein the audio devices (3) each comprise a human-machine interface (9), and wherein each audio device (3) is configured to send a notification message to the central device (2) based on an actuation of each audio device (3) and that each audio device (3) is in the notification mode, wherein the central device (2) comprises a list area (7), wherein the central device (2) is designed to list the audio devices (3) of the selected set in the list area (7) in an order in which the notification message is received at the central device (2), wherein the central device (2) comprises a model module (11) including a model (12) of a planned system configuration indicating positions of physical representatives in the planned system configuration, wherein the audio devices (3) are distributed to positions in the planned system configuration.

2. The audio arrangement (1) according to claim 1, wherein the human-machine interface (9) is an actuation button.

3. The audio arrangement (1) according to claim 1, wherein that the communication module (8) is configured to perform an auto setup, wherein during the auto setup, the communication module (8) scans the data environment (4) for the audio devices (3) or accepts setup messages from the audio devices (3) to detect the audio devices (3), wherein the central device (2) comprises a data technology basic area (5) for the basic set of audio devices (3), wherein the basic set comprises all detected audio devices (3), and wherein the selected set forms a proper subset of the basic set or corresponds to the basic set.

4. The audio arrangement (1) according to claim 1, wherein the audio devices (3) distributed to the positions in the planned system configuration in the model (12) are arranged as the list area (7) or are distributed as list area sections.

5. The audio arrangement (1) according to claim 4, wherein a list area section models a local collection (A, B, C, D, E) of audio devices (3).

6. The audio arrangement (1) according to claim 4, wherein the model module (11) comprises placeholders (13) for the list area sections, wherein the model module (11) is configured to select one or more placeholders (13) and list it with audio devices (3) of the selected set in the list area section of the placeholder (13) in the order in which the notification message is received at the central device (2).

7. The audio arrangement (1) according to claim 1, wherein the central device (2) comprises a user interface (10), wherein the central device (2) is configured to distribute the list areas, list area sections, or both in the model module (12) by input to the user interface (10).

8. A method for managing a system configuration of an audio arrangement (1), wherein the audio arrangement (1) comprises a central device (2) and a plurality of audio devices (3), the method comprising:
connecting the audio devices (3) by means of data technology to the central device (2) in a data environment (4),
activating, via the central device (2), a notification mode on audio devices (3) of a selected set,
transmitting, via the audio devices (3) activated in the notification mode, a notification message to the central device (2) when actuated,
listing, via the central device (2), the audio devices (3) of the selected set in a list area (7), and
distributing the audio devices (3) of the selected set to positions in a planned system configuration in a model (12), wherein the planned system configuration is picturized to indicate target physical positions of the audio devices (3).

9. The method according to claim 8, wherein the central device (2) performs an auto setup in a preliminary step or a supplementary step, wherein the central device (2) captures the audio devices (3) in the data environment (4) and forms or supplements a basic set from the captured audio devices (3).

10. The method according to claim 8, wherein in a first configuration mode, the selected set is determined based on a basic set, and the list area (7) and list area sections are distributed by a user in the model (12).

11. The method according to claim 8, wherein in a second configuration mode, the model (12) is or is being created with placeholders (13) for list area sections, wherein at least one placeholder (13) is selected and filled with audio devices (3) of the selected set in the order in which the notification message is received at the central device (2).

12. The method according to claim 8, wherein a unique address is assigned to each audio device (3) so that the central device (2) can selectively send messages to the audio devices (3).

* * * * *